(12) United States Patent
Steelman et al.

(10) Patent No.: US 11,749,059 B2
(45) Date of Patent: Sep. 5, 2023

(54) TOUCHLESS CASINO GAMING

(71) Applicant: Competition Interactive, LLC, Las Vegas, NV (US)

(72) Inventors: Paul Steelman, Las Vegas, NV (US); Keith Winters, Las Vegas, NV (US); Matthew Mahaney, Henderson, NV (US)

(73) Assignee: Competition Interactive, LLC, Las Vegas, NV (US)

( * ) Notice: Subject to any disclaimer, the term of this patent is extended or adjusted under 35 U.S.C. 154(b) by 0 days.

(21) Appl. No.: 17/316,655

(22) Filed: May 10, 2021

(65) Prior Publication Data

US 2021/0350660 A1 Nov. 11, 2021

Related U.S. Application Data

(60) Provisional application No. 63/022,423, filed on May 8, 2020.

(51) Int. Cl.

| | |
|---|---|
| *G07F 17/34* | (2006.01) |
| *G07F 17/32* | (2006.01) |
| *G06Q 20/32* | (2012.01) |
| *G06Q 20/36* | (2012.01) |
| *G06Q 50/34* | (2012.01) |
| *G06V 20/52* | (2022.01) |

(52) U.S. Cl.
CPC ....... *G07F 17/3237* (2013.01); *G06Q 20/326* (2020.05); *G06Q 20/3278* (2013.01); *G06Q 20/3678* (2013.01); *G06Q 50/34* (2013.01); *G06V 20/52* (2022.01); *G07F 17/322* (2013.01); *G07F 17/3223* (2013.01); *G07F 17/3244* (2013.01); *G07F 17/3262* (2013.01); *G07F 17/3276* (2013.01); *G07F 17/3293* (2013.01); *G07F 17/34* (2013.01)

(58) Field of Classification Search
CPC ............... G07F 17/3223; G07F 17/322; G07F 17/3237; G07F 17/3244; G07F 17/3262; G07F 17/3276; G07F 17/3293; G07F 17/34
See application file for complete search history.

(56) References Cited

U.S. PATENT DOCUMENTS

| | | | |
|---|---|---|---|
| 10,946,110 B1* | 3/2021 | Colvin | A61L 2/10 |
| 11,024,116 B1* | 6/2021 | Hoehne | G07F 17/3227 |
| 11,100,755 B2* | 8/2021 | deWaal | G07F 17/3267 |
| 2003/0104865 A1* | 6/2003 | Itkis | G07F 17/3239 |
| | | | 463/40 |
| 2005/0036316 A1* | 2/2005 | De Sisti | F21V 23/026 |
| | | | 362/264 |

(Continued)

*Primary Examiner* — David L Lewis
*Assistant Examiner* — Shauna-Kay Hall
(74) *Attorney, Agent, or Firm* — DENTONS Durham Jones Pinegar (57) ABSTRACT

A touchless gaming system includes one or more gaming stations, a registration device at each gaming station, and a game processor, as well as a personal electronic device used by each participant in a game offered by the touchless gaming system. The touchless gaming system enables an individual to participate in a live game (e.g., within a casino, etc.) while socially distancing the participants and eliminating the need for physical contact with objects that could infections agents. Touchless gaming methods are also disclosed.

28 Claims, 5 Drawing Sheets

(56) References Cited

U.S. PATENT DOCUMENTS

| | | | |
|---|---|---|---|
| 2007/0213116 A1* | 9/2007 | Crawford | G07F 17/3293 463/16 |
| 2008/0076506 A1* | 3/2008 | Nguyen | G07F 17/322 463/16 |
| 2009/0017888 A1* | 1/2009 | Kuhn | A63F 3/00157 463/16 |
| 2010/0016050 A1* | 1/2010 | Snow | G07F 17/3293 463/12 |
| 2013/0083066 A1* | 4/2013 | Aoki | H04M 1/72427 345/633 |
| 2014/0302915 A1* | 10/2014 | Lyons | G07F 17/3237 463/25 |
| 2017/0301188 A1* | 10/2017 | Pececnik | A63F 1/12 |
| 2020/0111279 A1* | 4/2020 | Cleveland | G07F 17/3209 |

\* cited by examiner

TOUCHLESS CASINO GAMING

CROSS-REFERENCE TO RELATED APPLICATION

A claim for priority to the May 8, 2020 filing date of U.S. Provisional Patent Application No. 63/022,423, titled TOUCHLESS CASINO GAMING ("the '423 Provisional Application") is hereby made pursuant to 35 U.S.C. § 119(e). The entire disclosure of the '423 Provisional Application is hereby incorporated herein.

TECHNICAL FIELD

This disclosure relates generally to devices, systems, and methods that enable individuals to participate in games within a casino without contacting gaming equipment or physical objects used in game play, or "game pieces." More specifically, this disclosure relates to systems that enable an individual to use his or her personal electronic device (e.g., a smart phone, a smart watch, etc.) to register for a game at a gaming station and to participate in the game without touching, or physically contacting, the gaming station or game pieces.

RELATED ART

Casino patrons typically enjoy the atmosphere and excitement of playing games of chance in a casino. In addition to the sights and sounds of the games, many people enjoy witnessing the emotions expressed by other patrons in the casino, as well as the ability to personally interact with each game and other participants in the game.

Unfortunately, the risk of infection by contagious diseases can be undesirably high within a casino. Casinos are often crowded, with large numbers of people in close proximity to one another and even physically contacting each other, for example, as they walk past each other, as they participate in or witness a game, or the like. Further, most casino games require some sort of physical contact, often with surfaces and physical objects that have been touched by a large number of others and, thus, may be contaminated with infectious agents (e.g., bacteria, viruses, etc.).

Although electronic and online versions of many of the games offered by casinos are available to anyone with a personal electronic device, remotely participating in a game of chance outside of a casino does not provide the atmosphere or the level of excitement offered within many casinos.

SUMMARY

In various aspects, devices, systems, and methods that enable an individual, or a player, to play a game within the environment of a casino while minimizing the risk of infection are disclosed.

A touchless gaming system according to this disclosure includes a gaming station within a casino. The system may enable an individual who is present at the gaming station to use a personal electronic device (e.g., a smart phone, a smart watch, etc.) to participate in the game, eliminating the need for the individual to contact the gaming station or anything else associated with the game.

In some embodiments, a gaming system within a casino may include a plurality of gaming stations, a registration device at each gaming station, and a game processor (e.g., a server, etc.) that facilitates use of a portable electronic device (i.e., an individual's personal electronic device) to place wagers on the game and participate in the game, or make game choices. The gaming stations of such a system may include any of a variety of tables at which one or more table crew members conduct games, as well as and stand-alone games, such as electronic games, slot machines, or the like.

The registration device at each gaming station may enable an individual who is physically present at the gaming station to register for a game. More specifically, the individual may open an app corresponding to the casino and/or the game on his or her personal electronic device and place the personal electronic device in proximity to the registration device to enable the app to register the personal electronic device and the individual holding the personal electronic device for game play at the gaming station. In some embodiments, the registration device may comprise a near field communication (NFC) device, which may communicate with (e.g., receive signals from, transmit signals to, etc.) an NFC device in the individual's personal electronic device.

The game processor of the gaming system may also communicate with the individual's personal electronic device (e.g., through an NFC connection, a Wi-Fi connection, etc.), enabling the individual to play the game through the personal electronic device while positioned in proximity to the gaming station but without physically contacting the gaming station. More specifically, once the individual has registered his or her personal electronic device with the registration device, the game processor may receive signals from the personal electronic device, enabling the individual to place bets and/or make play choices through the app that corresponds to the casino and/or the game. Additionally, the game processor may transmit signals corresponding to bets and/or play choices to the gaming station.

In more specific embodiments, a touchless gaming system may comprise a table, physical game pieces, seats, at least one camera, a game processor, and a table screen, or monitor.

The table may comprise a conventional game table (e.g., a blackjack table, a pai gow poker table, a baccarat table, etc.) at which a game is conducted by at least one table crew member (e.g., a dealer, a banker, a table boss, etc.).

The physical objects that are used to play the game, which are also referred to as the "game pieces" of such a touchless gaming system, may comprise the physical objects (e.g., cards, dice, etc.) that would conventionally have been touched by participants in the game, but are only touched by the table crew member in the touchless gaming system of this disclosure.

The seats may be positioned adjacent to or at least partially around the table. Positioning of the seats may facilitate social distancing between individual players, or participants, in the game. For example, the seats may be spaced a minimum distance apart from each other (e.g., six feet, eight feet, ten feet, etc.). Each seat may also be positioned a minimum distance apart from each table crew member. The number of seats adjacent to the table may also encourage social distancing or comply with social distancing requirements; i.e., the maximum number of seats may be limited (e.g., to four seats, three seats, etc.).

The camera(s) may be oriented to obtain images of the table and the physical game pieces on the table. A camera may be positioned over the table. In some embodiments, one or more cameras may obtain images of surface of the game pieces (e.g., cards, etc.) that face, or are positioned against, the surface of the table. Such cameras may provide each individual participating in the game with a private view of his or her game pieces (e.g., face-down cards, etc.).

The game processor may receive images from each camera, process the images, generate an electronic signal corresponding to an electronic display of the game, transmit the electronic signal to the personal electronic device of each individual player occupying a seat of the plurality of seats, and execute a program that enables each individual player to use his or her personal electronic device to participate in the game at the table without physically contacting the table or the physical game pieces on the table.

The table screen may be visible to the table crew member. It may enable the table crew member to confirm that a player processor of a personal electronic device of each participant has registered the participant for the game, the bet(s) placed by each participant, and play choices made by each participant. Once the table crew member receives a play choice made by a participant, the table crew member may take an appropriate action with one or more of the game pieces.

In another aspect, methods for playing a socially distanced game in a casino are disclosed. From the perspective of an individual playing the game, the individual may take and occupy a position (e.g., a seat, etc.) at a gaming station, such as a table, an electronic gaming machine, or a slot machine in the casino. The individual may then use his or her personal electronic device to register for the game (e.g., by opening an app and placing the personal electronic device in proximity to a registration device, such as an NFC device, etc.). While physical present for the game, the individual may witness game play at the gaming station. This may include any action by a standalone machine or a table crew member's interaction with one or more physical game pieces. The individual may participate in the game (e.g., place a bet, make a play choice, etc.) with his or her personal electronic device rather than by touching the gaming station (e.g., a table, any physical game pieces, etc.).

Where applicable, a table crew member may confirm that an individual has registered to play a game, confirm that the individual has placed a bet, and take appropriate actions made by the individual in response to any play choice made by the individual through his or her personal electronic device.

Thus, an individual may participate in the game in person and enjoy the atmosphere and excitement within a casino without physically contacting a gaming station and while socially distancing himself or herself from others.

Other aspects of the disclosed subject matter, as well as features and advantages of various aspects of the disclosed subject matter, should be apparent to those of ordinary skill in the art through consideration of the foregoing disclosure, the information that follows, and the appended claims.

DETAILED DESCRIPTION

Figure 1:
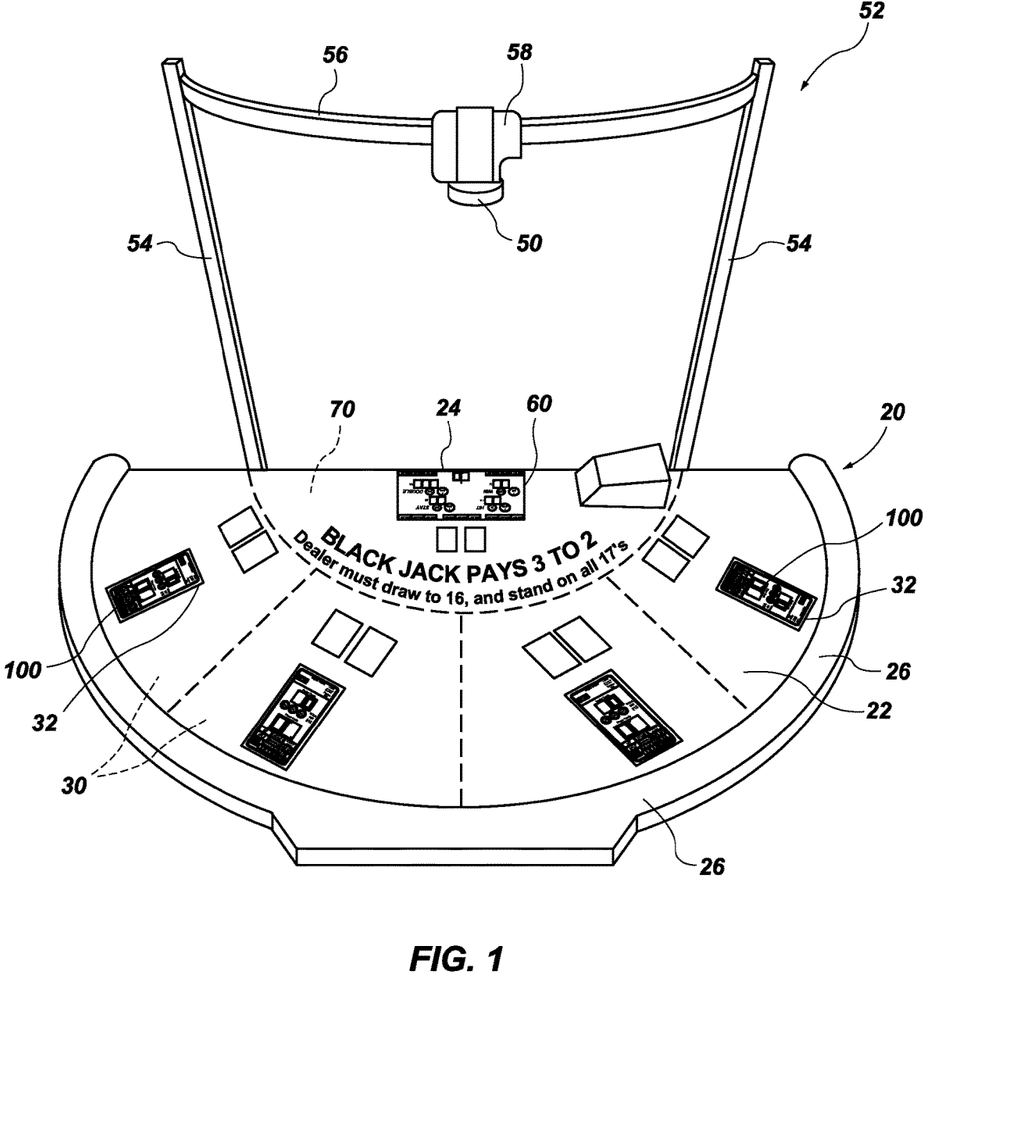
FIG. 1 is a perspective view of an embodiment of touchless gaming system according to this disclosure.
Figure 2:
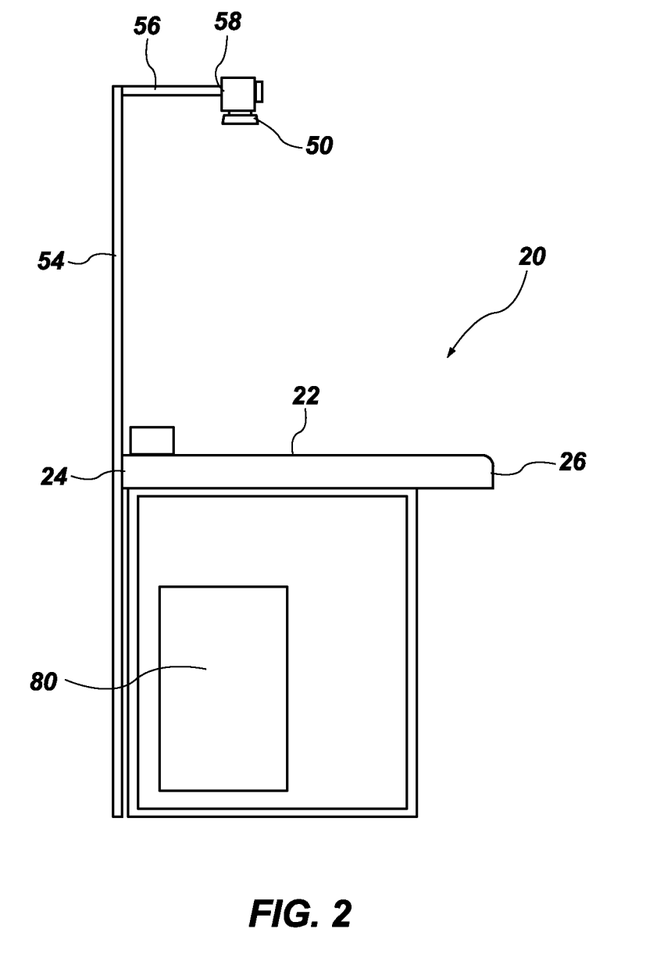
FIG. 2 is a side view of the embodiment of touchless gaming table shown in FIG. 1.

FIGS. 1 and 2 depict an embodiment of a touchless gaming system 10. The touchless gaming system 10 includes one or more gaming stations 30, a registration device 32 at each gaming station 30, and a game processor 80. In addition, the touchless gaming system 10 employs one or more portable electronic devices 100. In some embodiments, the touchless gaming system 10 may include a single gaming station 30, such as a standalone gaming device (e.g., a slot machine, a video gaming machine, etc.).

Alternatively, the touchless gaming system 10 may comprise a plurality of gaming stations 30, each of which may be occupied by an individual participating in a game administered by a table crew (e.g., a dealer, a banker, a table boss, etc.) using the touchless gaming system 10. In the specific embodiment depicted by FIG. 1, the touchless gaming system 10 includes various optional components, including physical objects 34 used to play a game (e.g., a specific game for which the touchless gaming system 10 is designed, etc.), a camera 50, a table screen 60, and a crew station 70.

As depicted by FIGS. 1 and 2, a table 20 of the touchless gaming system 10 may include game play surface 22, a table crew side 24, and a player side 26. A shape of the table 20 and the game play surface 22 of the table 20 may be designed or used in a particular game. In some embodiments, the table 20 and its game play surface 22 may have the configurations of a conventional game table (e.g., a blackjack table, a pal gow poker table, a baccarat table, etc.), at which a game may be conducted by at least one table crew member (e.g., a dealer, a banker, a table boss, etc.).

The table crew side 24 of the table 20 may be located somewhat opposite from the player side 26 of the table 20. The crew station 70 may be somewhat centrally located along the table crew side 24 of the table 20 to provide a table crew member situated (e.g., standing, seated, etc.) at a crew station 70 with ready access to the gaming stations 30 positioned along the player side 26 of the table 20.

The relative positions of the crew station 70 and each gaming station 30 may provide for social distancing between a table crew member working at the crew station 70 and each individual player situated (e.g., standing, seated, etc.) at a gaming station 30. For example, a location on the table crew side 24 of the table 20 within the crew station 70 where a table crew member will be situated may enable the table crew member to be spaced a minimum distance (e.g., six feet, eight feet, ten feet, etc.) apart from locations on the player side 26 of the table 20 within the gaming stations 30 wherein individual players may situate themselves.

The positions of the gaming stations 30 may provide for social distancing between the individual players situated at adjacent gaming stations 30 along the player side 26 of the table 20. For example, a location along the player side 26 of the table where an individual player will be situated (e.g., standing, seated, etc.) may enable that individual player to maintain a minimum distance (e.g., six feet, eight feet, ten feet, etc.) from each individual player situated (e.g., standing, seated, etc.) along the player side 26 of the table 20 at each adjacent gaming station 30.

The number of gaming stations 30 along the player side 26 of the table 20 may also encourage social distancing or comply with social distancing and occupancy or gathering requirements; i.e., the maximum number of gaming stations 30 may be limited (e.g., to four gaming stations 30, three gaming stations 30, etc.).

The registration device 32 at each gaming station 30 may enable an individual player who is physically present at the gaming station 30 to register for a game. More specifically, the individual may open an app corresponding to the casino and/or the game on his or her personal electronic device 100 and place the personal electronic device 100 on or in proximity to (e.g., within 36 inches of, within 30 inches of, within 24 inches of, within 18 inches of, within 12 inches of, etc.) the registration device 32 to enable the app to register the personal electronic device 100 and the individual player holding the personal electronic device 100 for game play at the gaming station 30. Conversely, the personal electronic device 100 and the individual player holding the personal electronic device 100 may become unregistered from game play when the personal electronic device 100 is removed from or moved out of proximity to the registration device 32.

Each registration device 32 may be mounted to the game play surface 22 of the table 20. Alternatively, each registration device 32 may be integrated into the game play surface 22; for example, it may be integrated into a material (e.g., a fabric, such as felt, etc.) of the game play surface 22 or the material of the game play surface 22 may be placed over each registration device 32. Each registration device 32 may comprise a near field communication (NFC) device, which may communicate with (e.g., receive signals from, transmit signals to, etc.) an NFC device in the individual's personal electronic device 100.

Physical objects 34 that are used to play the game may be placed on the game play surface 22 of the table 20. Some of the physical objects 34 may comprise game pieces (e.g., cards, dice, etc.) that would conventionally have been touched by participants in the game, but are only touched by a table crew member using the touchless gaming system 10 to administer the game.

One or more cameras 50 may obtain images of the game play surface 22 of the table 20 and any physical objects 34 on the game play surface 22. Each camera 50 may comprise any suitable digital camera. In some embodiments, the camera 50 may have a resolution of at least 8 megapixels, at least 12 megapixels (i.e., a 4K resolution), or more.

A camera support 52 may be associated with the table 20. The camera support 52 may position at least one camera 50 over the game play surface 22 of the table 20. The camera support 52 may include one or more vertical supports 54 secured to the table 20 and extending beyond its game play surface 22. In the embodiment illustrated by FIGS. 1 and 2, the camera support 52 includes a pair of vertical supports 54 located on the table crew side 24 of the table 20 on opposite sides of the table crew station 70. A horizontal support 56 may be secured to a top end 55 of each vertical support 54 and extend laterally to an elevation above and, optionally, a location over the game play surface 22. The elevation of the horizontal support 56 may prevent it from interfering with game play; for example, the horizontal support 56 may be positioned at a height (e.g., at least about 6', about 6'4", about 6'8", about 7', about 7'4", etc.) that exceeds an expected height of a table crew member standing at the table crew station 70. In the embodiment illustrated by FIGS. 1 and 2, the horizontal support 56 extends between the top ends 55 of the vertical supports 54 and has an arcuate shape that extends over the game play surface 22 of the table 20. A camera mount 58 may secure the at least one camera 50 to the horizontal support 56. In addition to carrying at least one camera 50, the camera support 52 may also carry wires (not shown) that provide power to each camera 50 and enable each camera 50 to communicate with other components of the touchless gaming system 10 (e.g., the game processor 80, the table screen 60, etc.).

The camera support 52 and/or the camera mount 58 may orient the camera 50 toward the game play surface 22 of the table 20. Thus, the camera 50 may obtain images of the game play surface 22 and any physical objects 34, such as game pieces, thereon.

The table screen 60 may be visible to the table crew member. In some embodiments, the table screen 60 may be incorporated into the game play surface 22 of the table 20. Alternatively, the table screen 60 may be positioned adjacent to the table 20. The table screen 60 may comprise any suitable monitor, such as a so-called "touch screen" that displays outputs and includes touch-sensitive elements that enable an individual to enter inputs with virtual objects displayed by the table screen 60.

The game processor 80 may track each individual player's registration for game play at his or her respective gaming station 30. The game processor 80 may also provide an output to the table screen 60 that enables a table crew member to confirm that a player processor of a personal electronic device 100 of each individual player has registered the individual player for the game. The game processor 80 may also enable a table crew member to admit each individual player to a game; for example, by way of inputs by the table crew member through the table screen 60.

Once game play has begun, the game processor 80 may also receive images from each camera 50 and process the images. Thus, the game processor 80 may execute software that recognizes physical objects 34 (e.g., game pieces, such as cards as they are dealt, etc.) on the game playing surface 22 of the table 20, as well as their locations (i.e., in the crew station 70, a particular gaming station 30, etc.) on the game playing surface 22. In addition, the game processor 80 may generate an electronic signal corresponding to an electronic display of the game. The game processor 80 may transmit the electronic signal to the personal electronic device 100 of each individual player occupying a gaming station 30 of the touchless gaming system 10 and execute a program that enables each individual player to use his or her personal electronic device 100 to participate in the game at the table 20 without physically contacting the table 20 or the physical objects 34 (e.g., game pieces, etc.) on the game playing surface 22 of the table 20. In addition, the game processor 80 may transmit a signal to the table screen 60.

In addition, the game processor 80 may enable a table crew member to confirm the bet(s) placed and play choices made by each individual player. Once the game processor 80 causes the table screen 60 to display a play choice made by an individual player, the table crew member may take an appropriate action with one or more of the physical objects 34 used to play the game.

Figure 3:
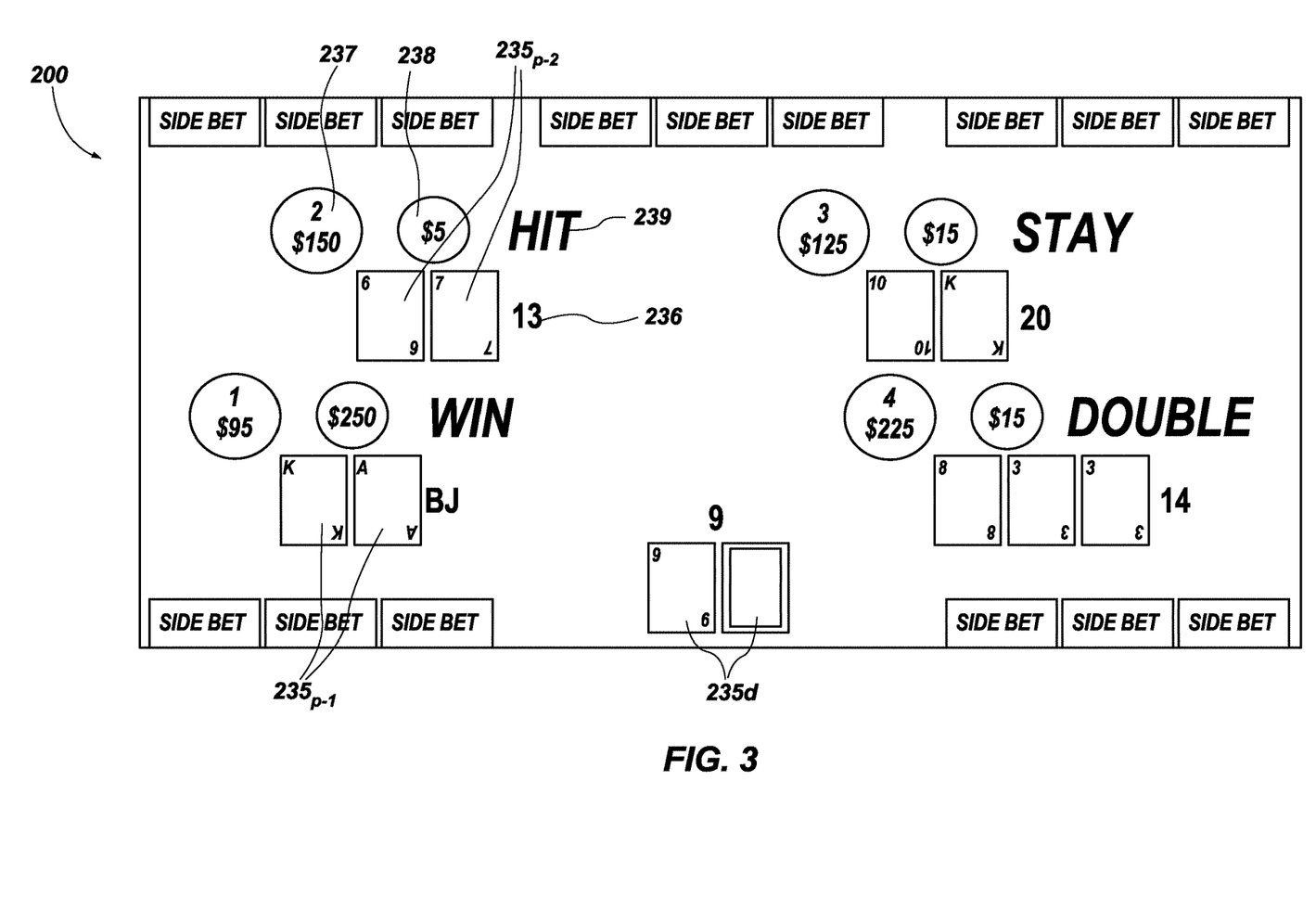
FIG. 3 displays an embodiment of a table screen associated with a touchless gaming table in such a way that the table screen may be viewable by one or more table crew members working at the touchless gaming table.

Turning now to FIG. 3, an embodiment of an image 200 that may be displayed by the table screen 60 (FIG. 1) of the touchless gaming system 10 (FIG. 1) is depicted. The image 200 shown in FIG. 3 corresponds specifically to a game of blackjack. However, it should be understood that the image 200 may display information relevant to any other game that may be played in a casino, either with a group of people or individually. As illustrated by FIG. 3, the image 200 may display the cards 235$d$ held by a dealer and the cards 235$p$-1, 235$p$-2, etc., held by each individual player, a value 236 associated with each individual player's cards, the total funds 237 allocated by the individual player to the game, each bet 238 placed by each individual player, and a play choice 239 made by each individual player.

Figure 4:
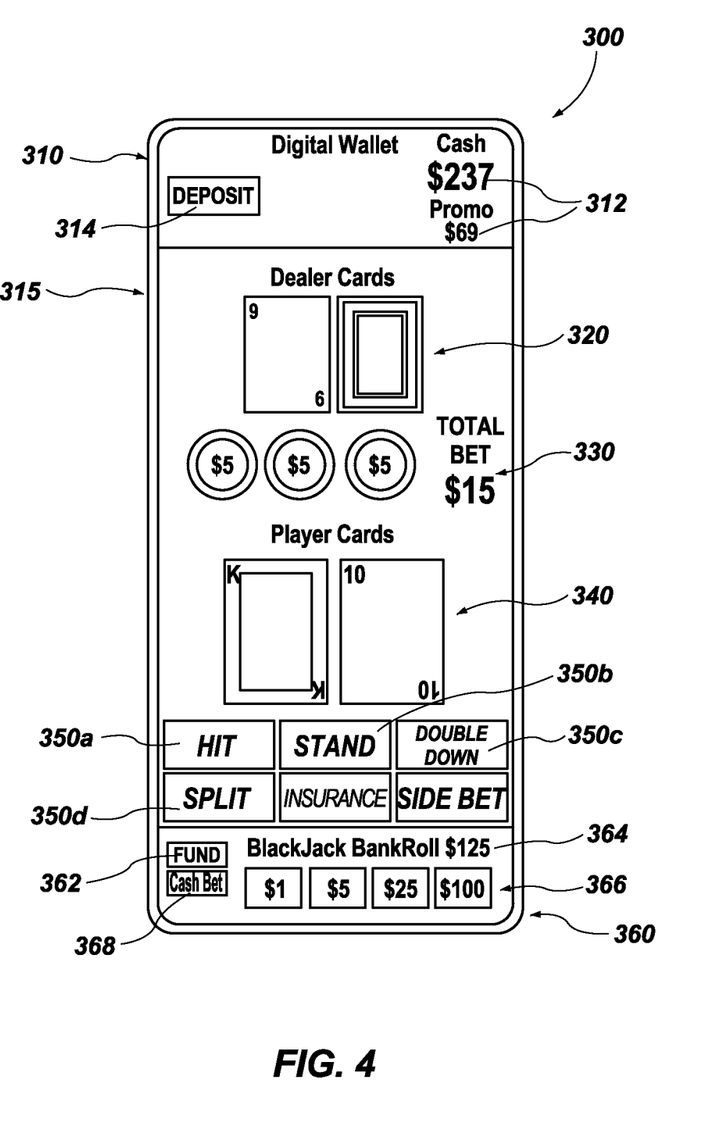
FIG. 4 displays an embodiment of a player screen accessible from a portable electronic device held by an individual player playing a game at a touchless gaming station.

FIG. 4 depicts an embodiment of an image 300 that a player processor of an individual player's personal electronic device 100, while executing the app, may cause a screen of the personal electronic device 100 to display. The image 300 may include a so-called "digital wallet" 310 that provides information on funds 312 that are available to the individual gamer while playing a game in the casino and a deposit button 314 that enables the individual player to deposit available funds, or transfer them from the digital wallet to another financial account. The image 300 may also include a table section 315 that displays the cards 320 held by a dealer, as well as the cards 340 held by the individual player. In addition, the image 300 may display a bet 330 placed by the individual player. The image 300 may also include virtual buttons 350a, 350b, etc., that enable the individual player to make certain game choices while playing the game (e.g., hit, stand, double down, split, insurance, placement of a side bet, etc., during a game of blackjack). In addition, the image 300 may include a bankroll section 360 that provides an individual player with an option 362 to fund a game, display funds 364 that are available for use in the game, display amounts 366 that are currently at risk in the game, and an option 368 to cash out of the game.

Figure 5:
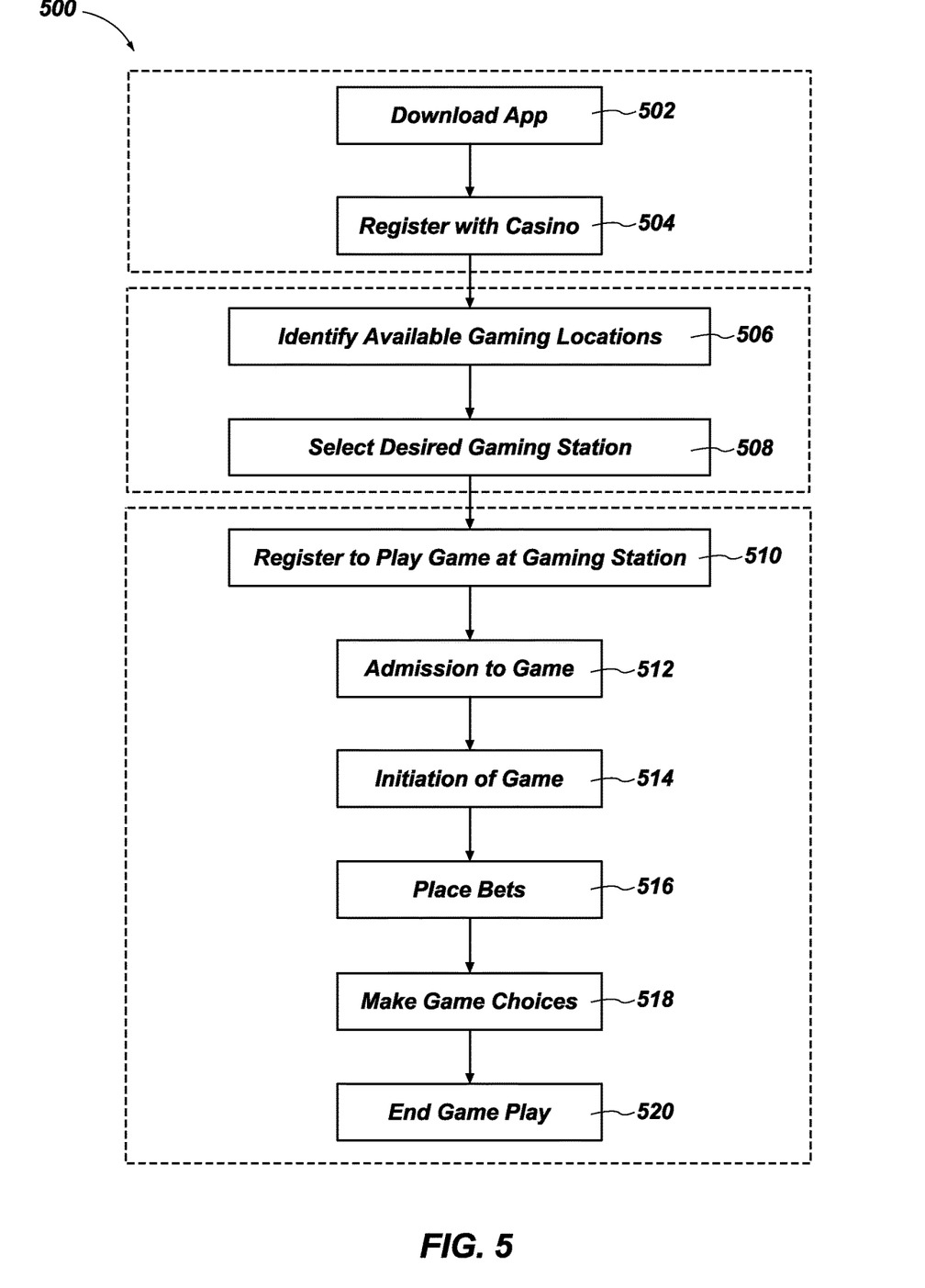
FIG. 5 is a flowchart depicting an embodiment of a method for participating in a touchless game.

FIG. 5 is a flow chart that depicts an embodiment of the elements of a method 500 for participating in a game using a touchless gaming system. To participate in the method 500, at reference 502, an individual player may use his or her personal electronic device 100 (FIG. 1) to download an app from a casino where he or she would like to play a touchless game. At reference 504, the individual player may use the app to register for game play at the casino. These acts may be performed prior to the individual player's visit to a casino or while the individual player visits the casino.

Once the individual player is in the casino and ready to participate in a game, he or she may, at reference 506, access the app on the personal electronic device 100 and use the app to view a floor layout of the casino, which may identify locations, or gaming stations 30 (FIG. 1) where the individual player may participate in a game. If one or more gaming stations 30 are available and the individual player wants to play the game offered at an available gaming station 30, he or she may go to the desired gaming station at reference 508.

Regardless of whether the individual player has used the app to identify one or more available gaming stations in a casino, once the individual player has reached an available gaming station 30 (FIG. 1), he or she may, at reference 510, approach the gaming station 30 and place his or her personal electronic device 100 (FIG. 1) on or in proximity to a registration device 32 (FIG. 1) at the gaming station 30. The app executed by the personal electronic device 100 may then automatically register the individual player for the game offered at the gaming station 30. In some embodiments, the app may confirm the identity of the player (e.g., by requiring a passcode, by way of biometric confirmation, etc.). The app may require the individual player to confirm that he or she actually wants to participate in the game (e.g., through the app executed by the personal electronic device 100, visually or verbally to a table crew member assigned to the gaming station 30, etc.). In addition, the app may confirm that the individual player has sufficient funds available to participate in the game (e.g., through a digital wallet, financial account, etc., accessible by the app, etc.).

Next, at reference 512, a table crew member assigned to the gaming station 30 (FIG. 1) may acknowledge the individual player's registration and admit the individual player to a game. Admission to a game may be immediate or delayed until the start of the next game. The table crew member may initiate a game at reference 514. The table crew member may initiate the game in any suitable way, such as by dealing cards or the like. The individual player uses his or her personal electronic device 100 (FIG. 1) to place bets at reference 516, make choices that would otherwise require touching a physical game piece at reference 518, and, optionally, to view physical objects 34 in his or her gaming station 30. The app may automatically settle bets at the conclusion of each game.

Once the individual player is done participating in the game offered at the game station 30 (FIG. 1), he or she may remove his or her personal electronic device 100 (FIG. 1) from or out of proximity to the registration device 32 (FIG. 1) at his or her gaming station 30 (FIG. 1), at reference 520. Upon removing the personal electronic device 100 from or out of proximity to the registration device 32, the app may unregister the individual player from the game being played at the gaming station 30. Alternatively, the individual player may use the app executed by the personal electronic device 100 to quit participating in the game.

Use of a touchless gaming system 10 (FIG. 1) according to this disclosure may enable individuals to visit a casino to participate in a live game with others while socially distancing from others. Use of such a touchless gaming system 10 also enables individuals to participate in the game without having to touch physical objects, such as game pieces, chips, money, or other objects, that could carry infectious agents from contact others. The individual only has to touch their own personal electronic device 100 (FIG. 1), which enables them to participate in the game and conduct financial transactions (e.g., placement of bets, receipt of winnings, etc.).

Although the foregoing description provides many specifics, these should not be construed as limiting the scope of any of the appended claims, but merely as providing information pertinent to some specific embodiments that may fall within the scope of one or more of the appended claims. Thus, other embodiments may also lie within the scopes of the appended claims. Features from different embodiments may also be employed in combination. All additions to, deletions from, combinations of, and modifications to the disclosed subject matter that fall within the scopes of the claims are to be embraced by the claims.

What is claimed:

1. A touchless gaming system, comprising:
a table at which a game is conducted by at least one table crew member;
physical game pieces to be used by the at least one table crew member while conducting the game;
a plurality of seats positioned adjacent to the table, each seat to be physically occupied by a player participating in the game;
at least one camera oriented to obtain images of the table and the physical game pieces on the table;
a game processor that receives the images from the at least one camera, processes the images, generates an electronic signal corresponding to an electronic display of the game, transmits the electronic signal to a personal electronic device of each player occupying a seat of the plurality of seats, and executes a program that enables each player to use the personal electronic device to play the game at the table without physically contacting the physical game pieces; and a table screen visible to the at least one table crew member to enable the at least one table crew member to confirm:
the game processor is in communication with a player processor of the personal electronic device of each player;
each player is registered for the game; and
each bet placed by each player.

2. The touchless gaming system of claim 1, wherein the table screen further enables the at least one table crew member to confirm:
a play choice made by each player.

3. The touchless gaming system of claim 1, further comprising:
a player registration system.

4. The touchless gaming system of claim 3, wherein the player registration system comprises at least one near field communication (NFC) device at the table that communicates with the personal electronic device of each player upon placement of the personal electronic device adjacent to the NFC device.

5. The touchless gaming system of claim 1, wherein the processor selectively communicates with a digital wallet of each player occupying a seat of the plurality of seats.

6. The touchless gaming system of claim 1, wherein the program executed by the processor enables each player occupying a seat of the plurality of seats to privately visualize at least one physical game piece of the physical game pieces.

7. The touchless gaming system of claim 1, further comprising:
the personal electronic device of each player occupying a seat of the plurality of seats; and
an app executed by the player processor of the personal electronic device, the app facilitating:
communication of the player processor with the game processor;
registration of the player for the game;
deposit of funds into a digital wallet associated with the player; and
placement of bets from the digital wallet.

8. The touchless gaming system of claim 7, wherein the app executed by the player processor also facilitates:
entry of a play choice made by each player into the personal electronic device; and
transmission of the play choice to the game processor.

9. The touchless gaming system of claim 1, wherein the physical game pieces comprise playing cards.

10. The touchless gaming system of claim 9, wherein the table comprises a blackjack table.

11. The touchless gaming system of claim 9, wherein the table comprises a pai gow poker table.

12. The touchless gaming system of claim 9, wherein the table comprises a baccarat table.

13. The touchless gaming system of claim 1, wherein each seat of the plurality of seats is positioned at least six feet away from every other seat of the plurality of seats and at least six feet away from a position occupied by the at least one table crew member adjacent to the table.

14. A gaming system within a casino, comprising:
a plurality of gaming stations in the casino, each gaming station of the plurality of gaming stations enabling an individual to play a game;
a registration device at each gaming station of the plurality of gaming stations that communicates with a personal electronic device of an individual at the gaming station to enable the individual to register for the game; and
a game processor that enables the individual to play the game through the personal electronic device while positioned in proximity to the gaming station without physically contacting the gaming station by:
receiving signals from the personal electronic device once the individual has used the personal electronic device to register for the game, the signals received by the game processor corresponding to:
a bet placed by the individual through the personal electronic device; and
a play choice made by the individual through the personal electronic device;
receiving images from at least one camera oriented to obtain images of the table and the physical game pieces on the table; and
transmitting signals to the gaming station corresponding to:
the bet placed by the individual; and
the play choice made by the individual.

15. The gaming system of claim 14, wherein the plurality of gaming stations includes at least one gaming table.

16. The gaming system of claim 14, wherein the plurality of gaming stations includes at least one electronic gaming terminal.

17. The gaming system of claim 14, wherein the plurality of gaming stations includes at least one slot machine.

18. A method for playing a socially distanced game in a casino, comprising:
occupying a seat at a table in the casino;
registering for the socially distanced game to be played on the table with a personal electronic device;
witnessing play of the socially distanced game on the table, including use of physical game pieces by a table crew member, from the seat at the table;
receiving, by the personal electronic device, an electronic signal corresponding to an electronic display of the socially distanced game generated from obtained images of the table and the physical game pieces on the table; and
playing the socially distanced game through the personal electronic device, without touching the physical game pieces on the table.

19. The method of claim 18, wherein registering for the socially distanced game comprises placing the personal electronic device in proximity to a registration device at the table.

20. Method of claim 18, wherein playing the socially distanced game comprises placing a bet through the personal electronic device.

21. The method of claim 20, wherein playing the game further comprises making a play choice through the personal electronic device.

22. The method of claim 18, further comprising:
verifying that each player occupying a seat at the table:
has registered for the socially distanced game;
has placed a bet; and/or
has made a play choice.

23. A touchless gaming system, comprising:
a table at which a game is conducted by at least one table crew member;
physical game pieces to be used by the at least one table crew member while conducting the game;
a plurality of seats positioned adjacent to the table, each seat to be physically occupied by a gamer participating in the game, each seat of the plurality of seats positioned at least six feet away from every other seat of the plurality of seats and at least six feet away from a position occupied by the at least one table crew member adjacent to the table;

at least one camera oriented to obtain images of the table and the physical game pieces on the table;

a game processor that receives the images from the at least one camera, processes the images, generates an electronic signal corresponding to an electronic display of the game, transmits the electronic signal to a personal electronic device of each player occupying a seat of the plurality of seats, and executes a program that enables each player to use the personal electronic device to play the game at the table without physically contacting the physical game pieces; and a table screen visible to the at least one table crew member to enable the at least one table crew member to confirm:

the game processor is in communication with a player processor of the personal electronic device of each player;

each player is registered for the game; and each bet placed by each player.

24. The touchless gaming system of claim 23, wherein the table screen further enables the at least one table crew member to confirm:

a play choice made by each player.

25. The touchless gaming system of claim 23, further comprising:

a player registration system that comprises at least one near field communication (NFC) device at the table that communicates with the personal electronic device of each player upon placement of the personal electronic device adjacent to the at least one NFC device.

26. The touchless gaming system of claim 23, wherein the program executed by the game processor enables each player occupying a seat of the plurality of seats to privately visualize at least one physical game piece of the physical game pieces.

27. The touchless gaming system of claim 23, further comprising:

the personal electronic device of each player occupying a seat of the plurality of seats; and an app executed by the player processor of the personal electronic device, the app facilitating:

communication of the player processor with the game processor;

registration of the player for the game;

deposit of funds into a digital wallet associated with the player; and placement of bets from the digital wallet.

28. The touchless gaming system of claim 9, wherein the table comprises one of a blackjack table, a pai gow poker table, or a baccarat table.

* * * * *